United States Patent
Forg et al.

(10) Patent No.: US 9,833,646 B2
(45) Date of Patent: Dec. 5, 2017

(54) FIRE PROTECTION CUFF

(75) Inventors: Christian Forg, Lamerdingen (DE);
Markus Kogler, Kaufering (DE);
Herbert Munzenberger, Wiesbaden (DE)

(73) Assignee: HILTI AKTIENGESELLSCHAFT, Schaan (LI)

( * ) Notice: Subject to any disclaimer, the term of this patent is extended or adjusted under 35 U.S.C. 154(b) by 0 days.

(21) Appl. No.: 13/431,605

(22) Filed: Mar. 27, 2012

(65) Prior Publication Data
US 2012/0251762 A1    Oct. 4, 2012

(30) Foreign Application Priority Data

Mar. 28, 2011   (DE) .................. 10 2011 006 211

(51) Int. Cl.
| | |
|---|---|
| *A62C 2/06* | (2006.01) |
| *A62C 8/06* | (2006.01) |
| *A62C 8/08* | (2006.01) |
| *E04B 1/90* | (2006.01) |
| *B32B 3/02* | (2006.01) |
| *B32B 3/04* | (2006.01) |
| *B32B 3/06* | (2006.01) |
| *F16L 5/04* | (2006.01) |

(52) U.S. Cl.
CPC ............... *A62C 2/065* (2013.01); *F16L 5/04* (2013.01); *Y10T 428/23* (2015.01)

(58) Field of Classification Search
CPC ... A62C 2/065; E04B 1/80; E04B 1/90; E04B 1/7641; E04B 1/942; E04B 1/943; E04B 1/944; E04B 1/948; E06B 5/164; F16L 5/04; Y10T 428/23; Y10T 428/2419; B32B 3/02; B32B 3/04; B32B 3/06

USPC ........... 428/68, 71, 913, 920, 921, 121, 130; 169/56, 58; 52/232

See application file for complete search history.

(56) References Cited

U.S. PATENT DOCUMENTS

| | | | | |
|---|---|---|---|---|
| 4,156,533 | A | * | 5/1979 | Close et al. ................. 277/652 |
| 4,816,312 | A | | 3/1989 | Annemaier et al. |
| 4,931,339 | A | * | 6/1990 | Malcolm-Brown ............ 428/71 |
| 5,236,769 | A | * | 8/1993 | Paire ............................ 428/196 |
| 5,258,216 | A | | 11/1993 | Von Bonin et al. |
| 5,402,615 | A | * | 4/1995 | Knott et al. ................ 52/309.1 |

(Continued)

FOREIGN PATENT DOCUMENTS

| | | |
|---|---|---|
| DE | 3536625 A1 | 4/1987 |
| DE | 4325966 A1 | 2/1995 |

(Continued)

OTHER PUBLICATIONS

3M Worldwide: United States: Manufacturing & Industrial; 1995-2007.*

(Continued)

*Primary Examiner* — Joanna Pleszczynska
(74) *Attorney, Agent, or Firm* — Grüneberg and Myers PLLC

(57) ABSTRACT

A fire protection cuff having a coat made of fire-resistant material and a strip made of intumescent material is characterized in that the coat includes a flexible mat, which is folded over around at least one of the longitudinal edges of the intumescent strip, so that the coat surrounds the intumescent strip at least on one large face and one of the two longitudinal edges.

20 Claims, 3 Drawing Sheets

(56) References Cited

U.S. PATENT DOCUMENTS

| | | | | |
|---|---|---|---|---|
| 6,128,874 A * | 10/2000 | Olson | ................. | E04B 1/948 52/232 |
| 6,572,948 B1 | 6/2003 | Dykhoff | | |
| 6,725,615 B1 | 4/2004 | Porter | | |
| 7,018,699 B2 * | 3/2006 | Dykhoff | ................. | 428/76 |
| 8,024,900 B2 * | 9/2011 | Cordts | ................. | F16L 5/04 52/220.8 |
| 2002/0155240 A1 * | 10/2002 | Andresen | ................. | 428/36.9 |
| 2006/0010798 A1 * | 1/2006 | Shaw | ................. | 52/232 |

FOREIGN PATENT DOCUMENTS

| | | |
|---|---|---|
| DE | 100 03 856 A1 | 8/2001 |
| DE | 10212066 A1 | 10/2003 |
| EP | 0 492 248 A2 | 7/1992 |

OTHER PUBLICATIONS

European Patent Office, European Search Report, in application No. 12154595.8 dated Jun. 16, 2014, 9 pages.
Official Action issued in German Patent Application No. 10 2011 006 211.4 dated Dec. 15, 2011, including English-language machine translation.

* cited by examiner

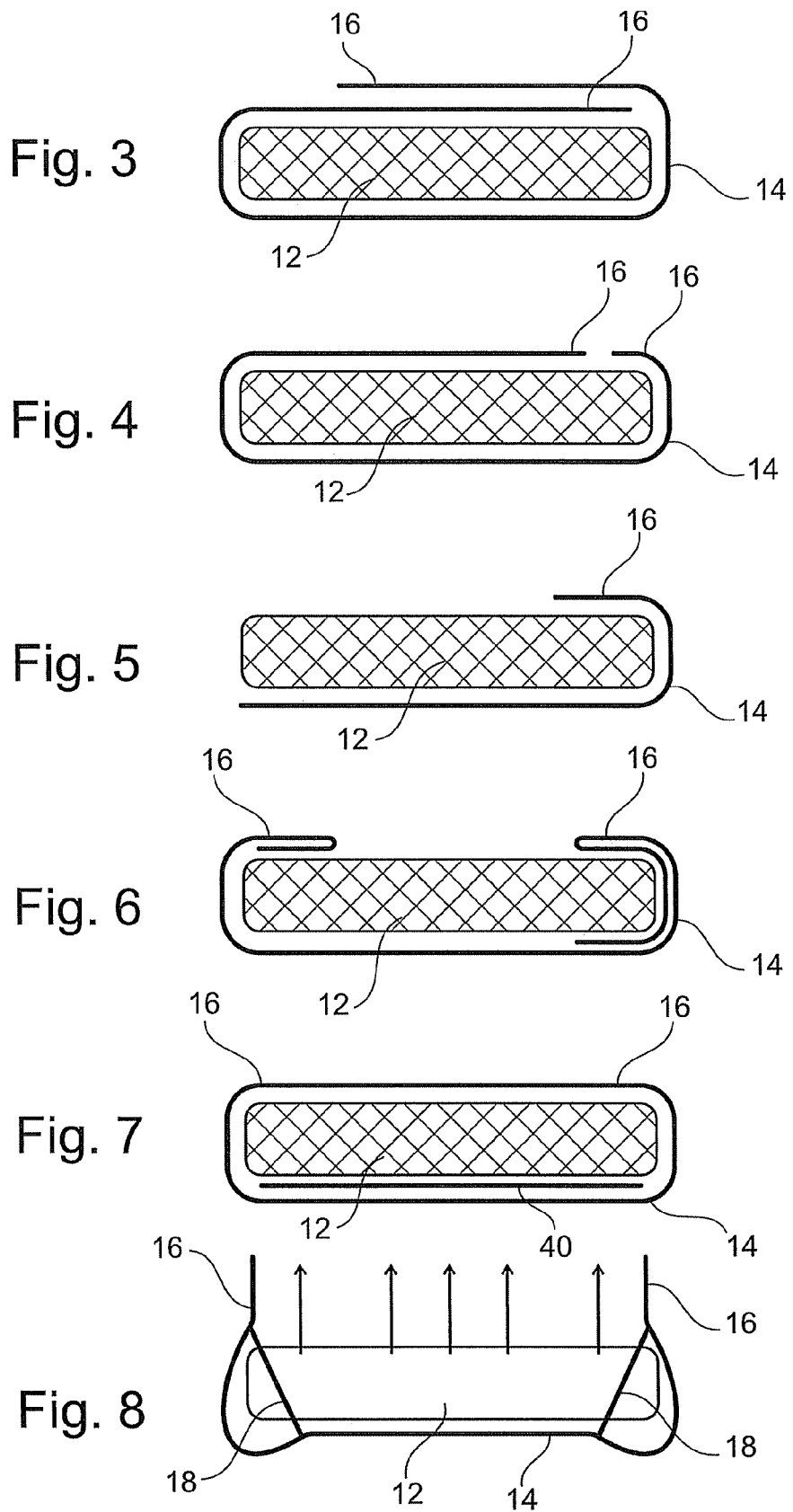

FIRE PROTECTION CUFF

CROSS-REFERENCE TO RELATED APPLICATIONS

The present application claims priority to German Patent Application DE 10 2011 006 211.4, filed Mar. 28, 2011, and entitled "Brandschutzmanschette" ("Fire Protection Cuff"), which is hereby incorporated by reference in its entirety.

BACKGROUND OF THE INVENTION

The present invention generally relates to a fire protection cuff including a coat made of a fire-resistant material and a strip made of intumescent material.

These types of fire protection cuffs have been disclosed in a variety of designs. They are used to seal openings through walls, ceilings or floors of buildings, which have flammable or meltable pipes, cables or similar fed through them in the event of a fire. For this purpose, the fire protection cuff is arranged around the pipes or cables so that the intumescent material, which expands during a fire seals the opening as tightly as possible. In the process, the fire protection cuff may be arranged either on the exterior of the opening, for instance on the wall, through which the opening leads or directly inside the opening if the latter has a diameter that still provides sufficient clearance between the pipes or cables and the opening.

Normally, sheet metal is used as coat for the strip. In the event of a fire, the coat is capable of supporting the swelling pressure of the intumescent material to ensure that the intumescent material specifically expands toward the direction, in which the opening is to be sealed. However, the disadvantage of known designs is that the coat is not very flexible and it is very expensive to cut it to the desired dimensions on site.

Furthermore, a coat made of sheet metal impairs the adjustment of the fire protection cuff in the presence of narrow radii of bend and in narrow spaces.

BRIEF SUMMARY OF THE INVENTION

One or more embodiments of the present invention provides a system and method for a fire protection cuff. The fire protection cuff includes a coat made of fire-resistant material and a strip made of intumescent material and is characterized in that the coat includes a flexible mat, which is folded over around at least one of the longitudinal edges of the intumescent strip, so that the coat surrounds the intumescent strip at least on one large face and one of the two longitudinal edges.

BRIEF DESCRIPTION OF THE DRAWINGS

One or more embodiments of the present invention are described below based on various exemplary embodiments, which are illustrated in the attached drawings. In the figures:

FIGS. 3 to 7 show schematic sectional views of fire protection cuffs with different coat designs;

FIG. 8 shows a schematic view of the geometric conditions if the intumescent strip is expanded out of the coat;

DETAILED DESCRIPTION OF THE INVENTION

Figure 1:
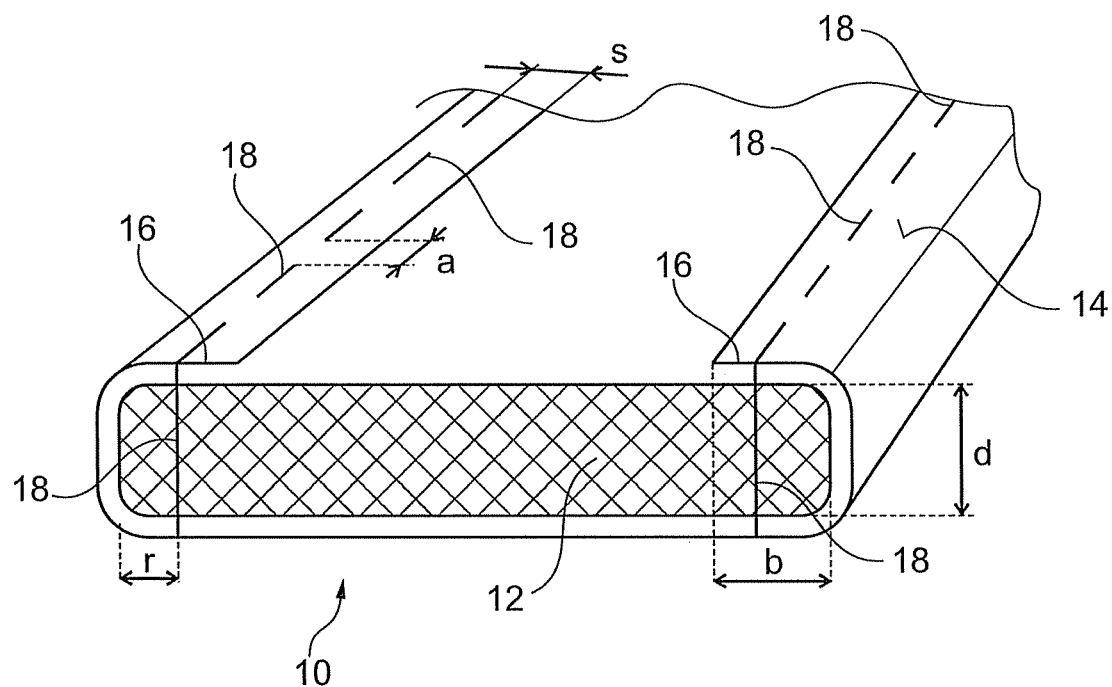
FIG. 1 shows an exploded sectional view of a fire protection cuff according to a first exemplary embodiment of the invention.

One or more embodiments of the present invention create a fire protection cuff, which may be used in a more flexible way, and which may be adjusted to the respective required dimensions on site more economically.

According to one or more embodiments of the present invention, the coat includes a flexible mat folded over around at least one of the longitudinal edges of the intumescent strip so that the coat surrounds the intumescent strip at least along one large face and along one of the two longitudinal edges. One or more embodiments of the present invention are based on the knowledge that even a coat made of a flexible mat is capable of providing an adequate support and directional effect, which reliably defines the direction of the intumescent strip in the event of a fire toward, which the latter is to be expanded. Based on the flexible mat, the fire protection cuff may be adjusted to the respective situation on site without major expenses and the length of the fire protection cuff may be adjusted on site without major expenses by cutting it to the desired length.

The coat is preferably folded over around both longitudinal edges. This improves the directional effect of the coat.

An exemplary embodiment of the invention provides that the bead folded over from the longitudinal side onto the large face has a width that equals at least half of the thickness of the intumescent strip. The width of the bead ensures that the coat forms a channel with its edges when the intumescent strip is expanding, which defines the direction of expansion of the intumescent material.

The bead is preferably not wider than 90% of the width of the intumescent strip. This ensures that the expansion of the intumescent material in the event of a fire is not impaired by the bead.

The coat is preferably attached on the intumescent strip along its longitudinal edge. This prevents that the bead completely opens when the intumescent material expands. Instead, the edge of the coat is fastened to the large face of the intumescent strip at an angle of about 90°, so that the coat essentially forms a duct, out of which the intumescent material expands directionally.

In the process, the coat may be sewed onto the intumescent strip or connected to the latter with clasps. Alternatively, the coat may be connected to the intumescent strip with rivets.

The intumescent strip preferably extends at least 2 mm beyond a line, along which the coat is connected with the intumescent strip. This way the coat is sufficiently firmly connected with the intumescent strip so that the latter cannot be detached from the coat at the beginning of the expansion.

The intumescent strip may be extruded onto the coat. This results in particularly low manufacturing costs because the fire protection cuff may be manufactured and delivered in the form of a continuous long strip. The required length is only cut from the strip on site, which may be achieved economically based on the material used for the coat.

The intumescent strip may also be manufactured separately from the coat and then glued onto it. This results in very low manufacturing costs. Furthermore, it is possible without any problems to cut the respective required length of the fire protection cuff from a continuous long strip without the need to consider a continuous seam. In combination with a suitable holder for the fire protection cuff, it may be provided even with a glued coat that the intumescent pressure is effective toward the desired direction.

The coat preferably has a grammage of at least 100 g/m². This type of material provides the required stability to guide the swelling pressure of the intumescent strip caused by the fire toward the desired direction.

A material is preferably used for the coat of the fire protection cuff, which is temperature resistant to at least 500° C. This ensures that the support function of the cuff in case of a fire is maintained long enough.

The flexible mat may in particular be a fabric or a fleece. In both cases, the fire protection cuff may economically be cut to the desired size on site, for instance by using shears, sheet shears or a cutter knife.

The coat may in particular comprise threads of glass, stone, ceramic and/or metal. This creates the desired temperature resistance. According to an embodiment of the invention, a metal strip is inserted between the coat and the intumescent material, including for example a metal foil or a thin metal sheet. This helps increase the support effect of the coat without making it significantly more difficult to cut the fire protection cuff to the desired length.

FIG. 1 shows a strip-shaped fire protection cuff 10, which comprises a strip 12 made of intumescent material. The intumescent material has a traditional composition, which comprises for example polymer-bonded active substances such as swelling graphite or ammonium polysulfate. In the illustrated exemplary embodiment, the intumescent strip 12 has a rectangular cross-section, for example with a width of 50 mm and a thickness of 5 mm.

A coat 14 is arranged around the intumescent strip 12, said coat including fabric or a fleece. The coat may contain threads of glass, stone, ceramic and/or metal. Coat 14 is heat resistant up to a minimum temperature of 500° C. With respect the desired stability, it has a minimum grammage of 100 g/m².

As seen in FIG. 1, coat 14 extends around a large face of intumescent strip 12, and then around the two narrow longitudinal edges to the other large face. In the exemplary embodiment shown in FIG. 1, coat 14 extends with two narrow beads 16 onto the large face, which is opposed to the completely covered large face (here: the underside). Each of the beads 16 has a width b, which is at least 50% of the thickness d of the intumescent strip. Intumescent strip 12 is exposed between the two beads 16.

Intumescent strip 12 may be extruded directly onto the material of coat 14 or glued onto the latter. Basically, it is also possible to place intumescent strip 12 loosely onto coat 14 and the fold over the edges. In any case, intumescent strip 12 is connected with coat 14 using fixing agents 18. The latter are formed with a seam in the exemplary embodiment shown in FIG. 1. For manufacturing-related reasons, the stitches have a minimum distance r of 2 mm from the outer edge of intumescent strip 12. The same minimum distance s is maintained from the free edge of the beads 16. The distance a between the stitches may range between 2 and 25 mm.

Metal clamps may be used instead of the seam 18, said clamps being driven into intumescent strip 12 at suitable distances to properly fixate the bead 16.

Figure 2:
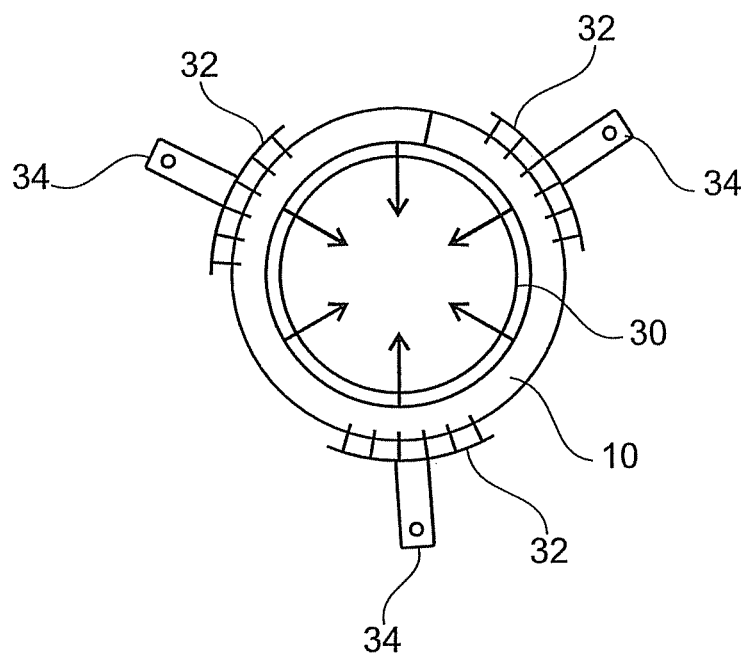
FIG. 2 shows a schematic top view of a mounted fire protection cuff.

FIG. 2 contains a schematic illustration of the fire protection cuff 10 attached to a pipe 30. The fire protection cuff 10 is folded over around the exterior circumference of the pipe 30 where it is fixated with a plurality of holders 32 including sheet metal and each comprising a fastening clip 34, with which they may be fixated on a wall, a floor or a ceiling, through which the pipe 30 is fed. In case of a fire, the intumescent material expands due to the heat exposure, thus sealing the opening, through which the pipe 30 is fed.

Based on the particularly high degree of flexibility of the fire protection cuff according to one or more embodiments of the invention, it is also possible to wrap it around lines or cables with a very small diameter.

FIG. 3 shows an alternative design of coat 14. In contrast to the exemplary embodiment illustrated in FIG. 1, both beads 16 are very wide in this case. To prevent the impairment of the expansion of intumescent strip 12, the width of the beads 16 is preferably not greater than 90% of the width of intumescent strip 12.

For the exemplary embodiment shown in FIG. 3, it may be possible to forego the fixation of the beads 16 on intumescent strip 12 using separate seams or clamps. An adequate directional effect may in particular also be achieved without seams or clamps by gluing the beads 16 onto intumescent strip 12.

FIG. 4 shows an exemplary embodiment, in which coat 14 is folded over asymmetrically around intumescent strip 12.

In the exemplary embodiment in FIG. 5, the bead 16 is only arranged on one side. This exemplary embodiment may be used for cases, in which the intumescent material is supported otherwise on the side where no bead is provided, for instance by a wall, which it tightly rests against.

In the exemplary embodiment shown in FIG. 6, the beads 16 are designed with two layers. This results in particularly high stability so that the seam 18 may also be arranged very close to the edge of the beads.

For the exemplary embodiment shown in FIG. 7, a metal strip 40 is arranged between coat 14 and the large face of intumescent strip 12, which is completely surrounded by the coat, said metal strip providing greater overall stability of the coat.

FIG. 8 is a schematic representation of the function of coat 14 in case of a fire when the intumescent material is expanding. The seam 18 keeps the bead 16 on intumescent strip 12 against the swelling pressure that is active on the edge, so that an essentially duct- or channel-shaped cross-section of coat 14 is obtained, through which the swelling effect is directed away from the side that is completely surrounded by coat 14 (here: upward). With a suitable design of the seam 18, a right-angled cross-section of the coat in the broadest sense may be created on the edges of the coat. In this way, coat 14 exerts a directional and support effect that is comparable with the one of a sheet metal coat.

In so doing, the mechanical strength of the seam 18 is designed in such a way that the seam withstands the emerging swelling pressure. Furthermore, the seam has the required temperature resistance. In particular, it should remain intact analogously to the mat up to a minimum temperature of 500° C. The actual seam design, i.e. seams with one, two or three threads, straight stitches, zigzag stitches, etc. is essentially irrelevant, so long as the seam achieves the desired stabilization of the edge area of coat 14 when exposed to the swelling pressure.

Figure 9:
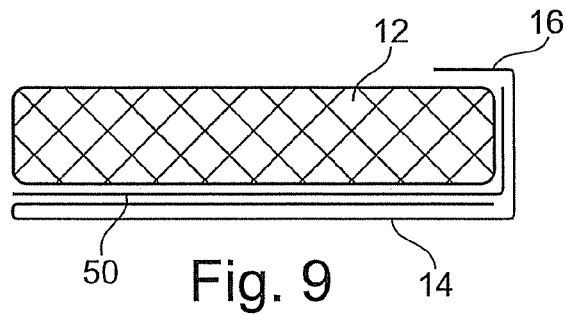
FIG. 9 shows a schematic sectional view of a fire protection cuff according to an additional exemplary embodiment.

FIG. 9 shows an exemplary embodiment, in which coat 14 only extends around one of the narrow longitudinal edges similar to the exemplary embodiment according to FIG. 5. In contrast to the exemplary embodiment of FIG. 5, coat 14 is designed with two layers on the large face of intumescent strip 12, wherein the loose end of the coat is folded inward. This prevents the risk that the edge of coat 14 is fraying.

In this exemplary embodiment, coat 14 is glued onto intumescent strip 12 (see adhesive layer 50 extending across the large face and one of the narrow longitudinal edges of intumescent strip 12).

Figure 10:
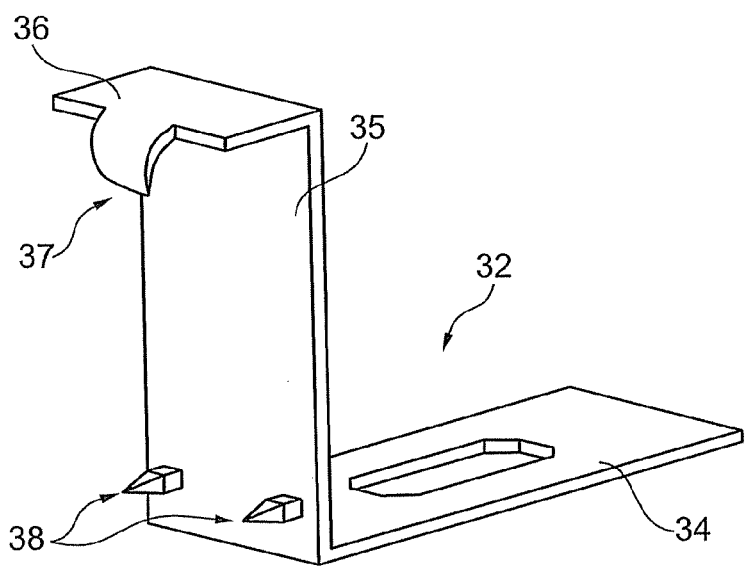
FIG. 10 shows a schematic view of a fastening claw used for fastening the fire protection cuff of FIG. 9.
Figure 11:
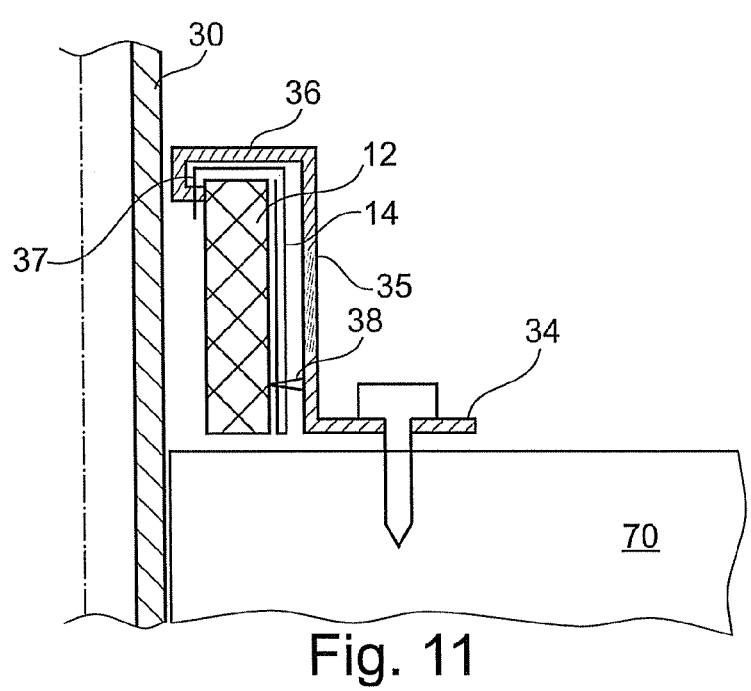
FIG. 11 shows a schematic sectional view of the fire protection cuff of FIG. 9 attached on a pipe lead-in using the holder of FIG. 10.

To ensure that the swelling pressure reliably acts toward the desired direction in the exemplary embodiment with a glued coat, a plurality of holders 32 are used, which are arranged distributed around the fire protection cuff in circumferential direction as illustrated in FIG. 2. The holder 32 (see also FIG. 10) includes sheet metal and comprises a bracing section 35 as well as an anchoring section 36. The bracing section 35 extends along the large exterior face of intumescent strip 12 and supports the double-layer coat 14. The anchoring section 36 surrounds the narrow longitudinal side of intumescent strip 12 and the bead 16. To improve the mechanical support, a mandrel 37 is provided on the free end of the anchoring section 36, to retain coat 14 on intumescent strip 12. Furthermore, mandrels 38 may be provided on the bracing section 35, used to fasten coat 14 on the large face of the intumescent strip.

Since coat 14 is used with a double layer on the large face of intumescent strip 12, it is possible to use a fabric with a lower grammage for the coat. This has the advantage that the fire protection cuff may be folded around the pipe and the line(s) easier, because the coat is thinner on the side facing the pipe or the lines than on the exterior side. Because the coat is bent or rolled around two different edges of bend with different radii if the fire protection cuff 10 is attached on a pipe or a line leg, reducing the grammage has an extremely positive effect. Another advantage of this exemplary embodiment is the fact that the costs for the fabric are lower due to the lower grammage. Based on the collaboration with the holder 32, the necessary stability against the emerging intumescent pressure is also ensured for "lighter-weight" fabric. The double layers of coat 14 increase the tearing resistance at the puncture site of the mandrels 38.

By collaborating with coat 14, the holder 32 ensures that the swelling pressure acts inward in a radial direction, because the anchoring section 36 together with the bead 16 prevents or at least severely impairs the expansion of intumescent strip 12 in axial direction.

While particular elements, embodiments, and applications of the present invention have been shown and described, it is understood that the invention is not limited thereto because modifications may be made by those skilled in the art, particularly in light of the foregoing teaching. It is therefore contemplated by the appended claims to cover such modifications and incorporate those features which come within the spirit and scope of the invention.

The invention claimed is:

1. A fire protection cuff, comprising:
an intumescent strip having two opposed faces and two longitudinal edges extending between the faces;
a flexible, fire-resistant fabric material coat around a first edge of the two longitudinal edges of the intumescent strip and not around a second edge of the two longitudinal edges of the intumescent strip, leaving the second edge fully exposed, and
an adhesive, securing the coat to a first face of the two opposed faces of the intumescent strip,
wherein a backing portion of the coat surrounds the intumescent strip along the first face of the two opposed faces, a first edge portion of the coat surrounds the intumescent strip along the first edge, and a front portion of the coat forms a first bead covering up to 90% widthwise of a second face of the two opposed faces, leaving at least 10% widthwise of the second face exposed.

2. The fire protection cuff of claim 1, wherein the first bead has a width that equals at least half of a thickness of the in tumescent strip.

3. The fire protection cuff of claim 1, comprising at least 2 mm of the intumescent strip between the first edge and a line of connection with the coat.

4. The fire protection cuff of claim 1, wherein the intumescent strip comprises extruded intumescent material.

5. The fire protection cuff of claim 1, wherein the coat is folded over to provide the backing portion with two coat layers along the first face of the intumescent strip.

6. The fire protection cuff of claim 1, wherein the coat has a grammage of at least 100 $g/m^2$.

7. The fire protection cuff of claim 1, wherein the coat is temperature resistant to at least 500° C.

8. The fire protection cuff of claim 1, wherein the coat comprises a fleece.

9. The fire protection cuff of claim 1, wherein the coat comprises threads of glass, stone, ceramic and/or metal.

10. The fire protection cuff of claim 1, further comprising a metal strip between the backing portion of the coat and the first face of the intumescent strip.

11. The fire protection cuff of claim 10, wherein the metal strip includes a metal foil or a sheet metal.

12. The fire protection cuff as set forth in claim 1, wherein a first free end of the flexible mat is folded under the flexible mat causing the first bead to include two layers of the flexible mat.

13. The fire protection cuff of claim 1, wherein the coat is configured to form a duct in the presence of swelling pressure from the intumescent strip, thereby guiding heat-induced swelling of the intumescent strip away from the first face and the associated backing portion of the coat, and away from the first edge of the two longitudinal edges of the intumescent strip.

14. The fire protection cuff of claim 1, consisting essentially of the intumescent strip, the coat, the adhesive, optionally stitches, optionally rivets, optionally clasps, and optionally clamps.

15. A fire protection cuff, comprising:
an intumescent strip having two opposed faces and two longitudinal edges extending between the faces;
a flexible, fire-resistant fabric material coat around a first edge of the two longitudinal edges of the intumescent strip and not around a second edge of the two longitudinal edges of the intumescent strip and leaving the second edge fully exposed, and
stitches, rivets, clasps, and/or clamps, securing the coat to the intumescent strip along a first seam positioned away from the first edge,
wherein a backing portion of the coat surrounds the intumescent strip along a first face of the two opposed faces, a first edge portion of the coat surrounds the intumescent strip along the first edge, and a front portion of the coat forms a first bead covering up to 90% widthwise of a second face of the two opposed faces.

16. The fire protection cuff of claim 15, wherein the stitches, rivets, clasps, and/or clamps comprise a sewn thread.

17. The fire protection cuff of claim 15, wherein the stitches, rivets, clasps, and/or clamps comprise clamps.

18. The fire protection cuff of claim 15, wherein the stitches, rivets, clasps, and/or clamps comprise rivets.

19. The fire protection cuff of claim 15, wherein the coat is configured to form a duct in the presence of swelling pressure from the intumescent strip, thereby guiding heat-induced swelling of the intumescent strip away from the first face and the associated backing portion of the coat, and away from the first edge of the two longitudinal edges of the intumescent strip.

20. The fire protection cuff of claim 15, consisting essentially of:
   the intumescent strip;
   the coat;
   the stitches, rivets, clasps, and/or clamps; and
   optionally an adhesive.

* * * * *